(12) United States Patent
DeFrance

(10) Patent No.: US 8,383,945 B2
(45) Date of Patent: Feb. 26, 2013

(54) DEAD END CONNECTOR

(75) Inventor: Robert V. DeFrance, Poughkeepsie, NY (US)

(73) Assignee: Hubbell Incorporated, Shelton, CT (US)

( * ) Notice: Subject to any disclaimer, the term of this patent is extended or adjusted under 35 U.S.C. 154(b) by 206 days.

(21) Appl. No.: 12/799,160

(22) Filed: Apr. 19, 2010

(65) Prior Publication Data

US 2010/0263927 A1 Oct. 21, 2010

Related U.S. Application Data

(60) Provisional application No. 61/171,195, filed on Apr. 21, 2009.

(51) Int. Cl.
*H02G 15/02* (2006.01)

(52) U.S. Cl. .................................................. 174/74 R

(58) Field of Classification Search ............... 174/74 R, 174/79; 403/11, 213, 284
See application file for complete search history.

(56) References Cited

U.S. PATENT DOCUMENTS

| | | | |
|---|---|---|---|
| 3,220,677 A | 11/1965 | Sweeney | 248/49 |
| 3,403,219 A | 9/1968 | Klosin | 174/79 |
| 3,426,143 A * | 2/1969 | Anderson | 174/79 |
| 4,183,686 A * | 1/1980 | De France | 403/11 |
| 4,224,878 A | 9/1980 | Marsden | 105/253 |
| 5,895,430 A | 4/1999 | O'Connor | 623/39 |
| 6,201,184 B1 | 3/2001 | Francois et al. | 174/43 |
| 6,336,465 B1 | 1/2002 | Surrendi et al. | 135/128 |
| 7,348,489 B2 | 3/2008 | Chadbourne | 174/74 |
| 7,385,138 B2 | 6/2008 | De France et al. | 174/84 |
| 2002/0106239 A1 | 8/2002 | Grabenstetter et al. | 403/374.2 |
| 2006/0084327 A1 | 4/2006 | Chadbourne | 439/784 |

OTHER PUBLICATIONS

"Automatic Dead Ends", Z. Bail., Fargo MFG. Company, Inc., Section 3, p. 2-A (Feb. 1976), 2 pages.

* cited by examiner

*Primary Examiner* — Chau Nguyen
(74) *Attorney, Agent, or Firm* — Harrington & Smith

(57) ABSTRACT

A dead end connector member including a shaft section and a clevis section. The shaft section includes a ridge section, wherein the ridge section is sized and shaped to have an outer sleeve compressed thereon to connect the outer sleeve to the shaft section. The clevis section has a front end connected to the shaft section. The clevis section includes two spaced legs forming an eyebolt receiving gap between the legs. Each leg comprises a pin hole adapted to receive a fastener to rotatably connected the dead end connector to an eyebolt of another member. The clevis section includes a tab at a rear end of the clevis section. The tab extends at least partially across the gap to form a rotation limiter adapted to contact one side of the eyebolt and limit rotation of the dead end connector member relative to the eyebolt in only one direction.

16 Claims, 4 Drawing Sheets

DEAD END CONNECTOR

CROSS REFERENCE TO RELATED APPLICATION

This application claims priority under 35 USC 119(e) on provisional patent application No. 61/171,195 filed Apr. 21, 2009, which is hereby incorporated by reference in its entirety.

BACKGROUND OF THE INVENTION

1. Field of the Invention

The invention relates to a dead end connector and, more particularly, to a system for connecting an electrical conductor to a support.

2. Brief Description of Prior Developments

U.S. Pat. No. 7,348,489 B2, which is hereby incorporated by reference in its entirety, discloses a dead end electrical connector assembly having a clevis.

Core and stranded (C-S) cables are know, such as an Aluminum Conductor Steel Reinforced (ACSR) cable, an Aluminum Conductor Composite Core (ACCC) cable, and an Aluminum Conductor Steel Supported (ACSS) cable for example. As described in U.S. Pat. No. 7,385,138 B2, which is hereby incorporated by reference in its entirety, such cables have a core and strands of electrically conductive metal wrapped around the core. The core functions as a support to allow the cable to be supported over an extended length from opposite ends, such as in overhead high tension lines used in high voltage power distribution networks. The metal conductor strands function as the electrical conductors.

Electrical connectors are used to mechanically and electrically connect the C-S cables. Examples of electrical connectors for C-S cables are described in U.S. Pat. Nos. 6,805,596, 6,015,953 and 7,019,217 B2 for example. Screw-on inner sleeve type of electrical connectors prevent excessive compression on a composite core of a ACCC cable which could otherwise damage the core.

SUMMARY

The following summary is merely intended to be exemplary. The summary is not intended to limit the scope of the claimed invention.

In accordance with one aspect of the invention, a dead end connector member is provided including a shaft section and a clevis section. The shaft section includes a ridge section, wherein the ridge section is sized and shaped to have an outer sleeve compressed thereon to connect the outer sleeve to the shaft section. The clevis section has a front end connected to the shaft section. The clevis section includes two spaced legs forming an eyebolt receiving gap between the legs. Each leg comprises a pin hole adapted to receive a fastener to rotatably connected the dead end connector to an eyebolt of another member. The clevis section includes a tab at a rear end of the clevis section. The tab extends at least partially across the gap to form a rotation limiter adapted to contact one side of the eyebolt and limit rotation of the dead end connector member relative to the eyebolt in only one direction.

In accordance with another aspect of the invention, a dead end connector is provided comprising a dead end connector member, an outer sleeve, an inner sleeve, and jaws. The dead end connector member comprises a shaft section and a clevis section. The clevis section comprises two spaced legs forming an eyebolt receiving gap between the legs and a tab at a rear end of the clevis section. The tab extends at least partially across the gap to form a rotation limiter adapted to contact one side of an eyebolt and limit rotation of the dead end connector member relative to the eyebolt in one direction. The outer sleeve is connected over the shaft section. The inner sleeve is located inside the outer sleeve at a front end of the dead end connector member. The jaws are located in the inner sleeve, wherein the jaws are adapted to be compressed by the inner sleeve and clamp onto a core of a core and stranded (C-S) cable.

In accordance with another aspect of the invention, a method is provided comprising connecting a dead end connector to a core and stranded (C-S) cable comprising clamping a core of the C-S cable by jaws and connecting the jaws to a dead end connector member, wherein the dead end connector member comprises a shaft section connected to the jaws and a clevis section connected to the shaft section, wherein the clevis section comprises two spaced legs forming an eyebolt receiving gap between the legs and a tab at a rear end of the clevis section, wherein the tab extends at least partially across the gap to form a rotation limiter; and connecting the dead end connector member to an insulator, wherein the insulator comprises ceramic insulating members and an eyebolt at an end of the ceramic insulating members, wherein the eyebolt is located in the gap of the clevis section, and wherein the tab is located relative to the eyebolt to limit rotation of the dead end connector member relative to the eyebolt in one direction.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENT

Figure 1:
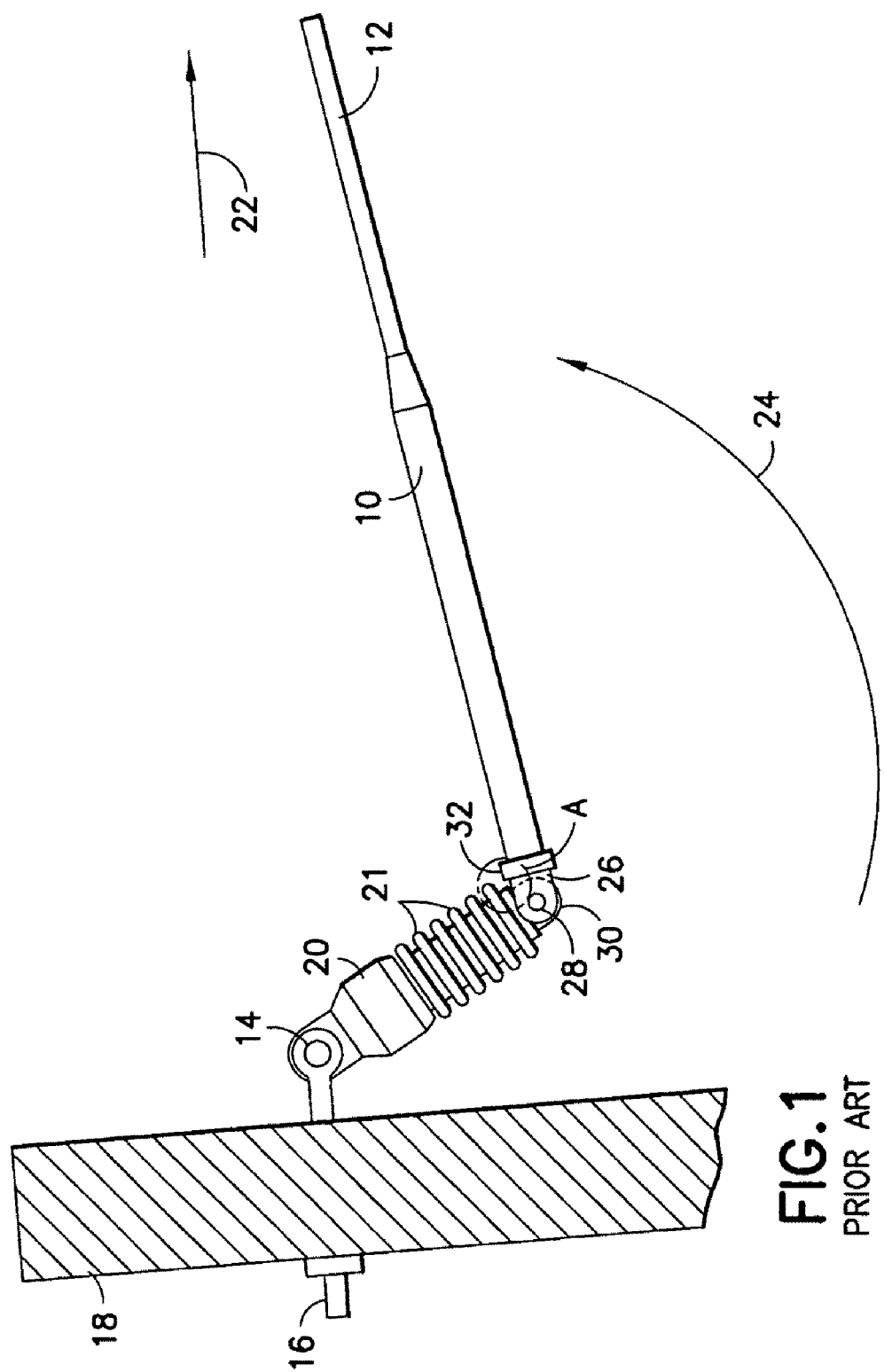
FIG. 1 is a side view of a conventional dead end connector shown connecting a cable to an electrical insulator on a support member.

Referring to FIG. 1, a conventional dead end connector 10 is shown connected to a conductor 12, such as an electrical conductor used in an over-head high tension power distribution system for example. The conductor 12 in this example is a conductor having a composite core, such as an Aluminum Conductor Composite Core (ACCC) cable for example. The connector 10 is a composite core connector similar to that described in U.S. Pat. No. 7,348,489 B2.

In the example shown, the connector 10 is connected by an insulator 20, a pin 14 and an eyebolt 16 to a supporting structure or device 18. The insulator 20 electrically insulates the connector 10 from the structure 18. The insulator 20 can include ceramic members 21, for example, which can be brittle. The insulator 20 can also have an end member or eyebolt 30 for connection to the connector 10. The connector 10 in this example has a clevis end 26 connected by a pin 28 to the eyebolt 30 of the insulator 20; which is located between legs of the clevis end 26.

Initially, when the connector 10 is connected to the insulator 20, they hang down from the eyebolt 16. The conductor 12 is then pulled in direction 22 to put the conductor 12 in tension. The insulator 20 and connector 10 swing upward as indicated by arrow 24. Special care is applied to assure that the insulator 20 does not get damaged. This special care adds cost to the installation procedure. Even with special care, the insulator 20 can still get damaged. For example, when the connector 10 is being pulled up to reduce the slack in the conductor 12, the connector 10 can rotate relative to the insulator 20 and cause damage to the insulator 20. As shown in area A of FIG. 1, the dead end connector 10 can pivot too much relative to the insulator 20. This can result in the portion 32 of the connector 10 cracking or breaking a portion of the insulator 20 because of this contact.

Figure 2:
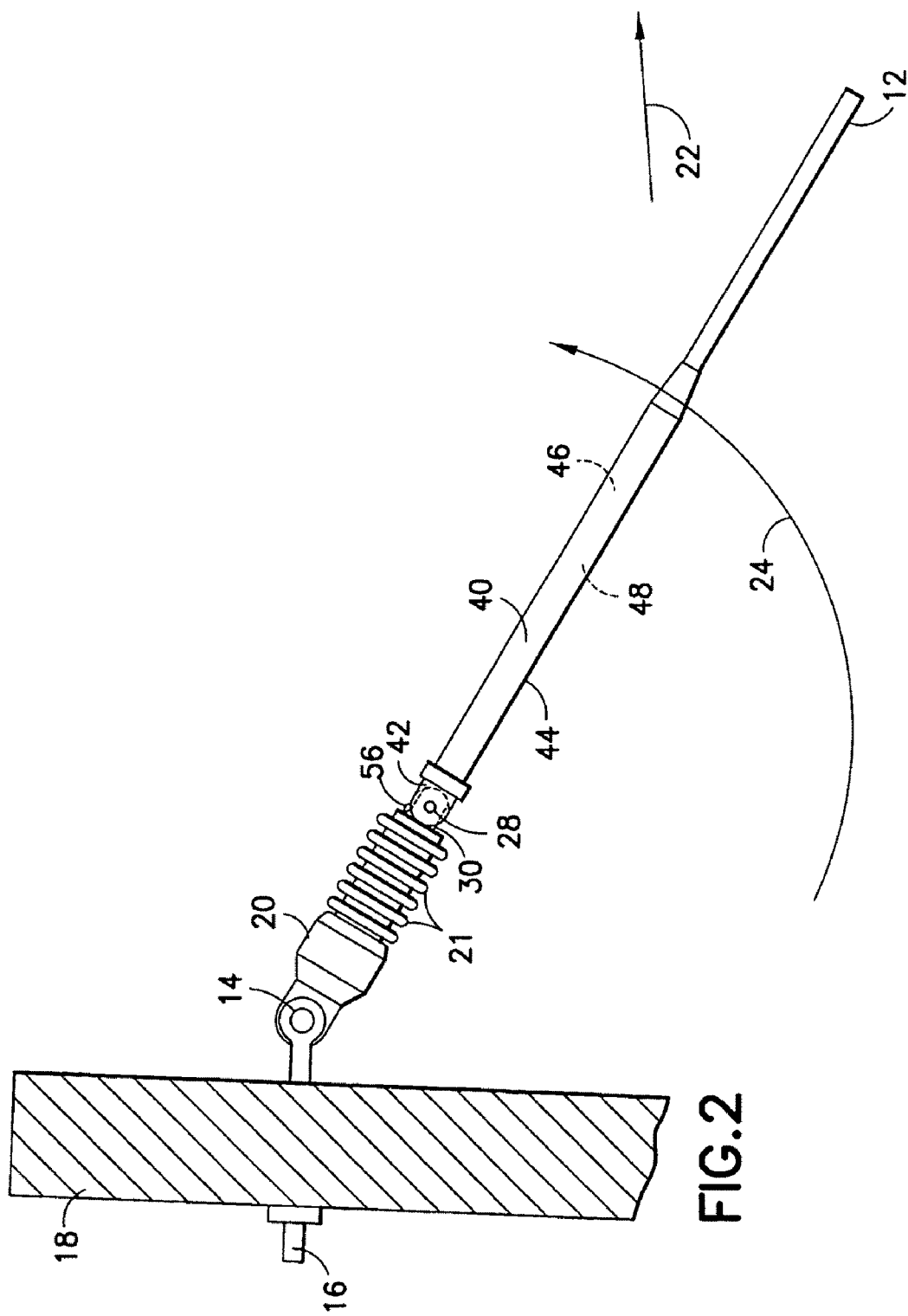
FIG. 2 is a side view of a dead end connector incorporating features of the invention shown connecting a cable to an electrical insulator on a support member.
Figure 5:
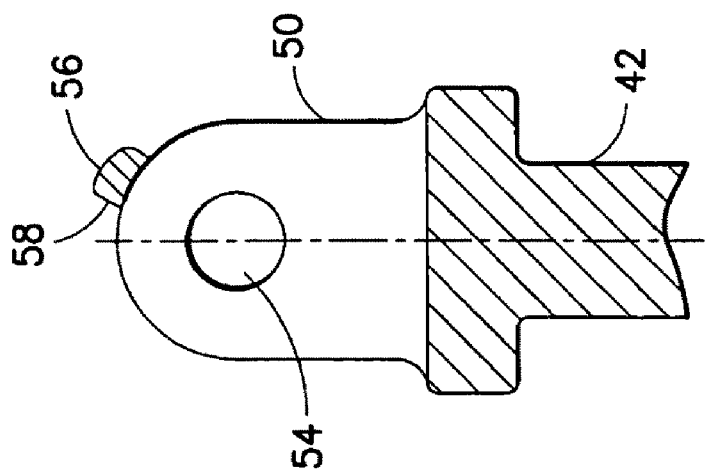
FIG. 5 is a cross sectional view of the clevis section shown in FIG. 4 taken along line A-A.
Figure 4:
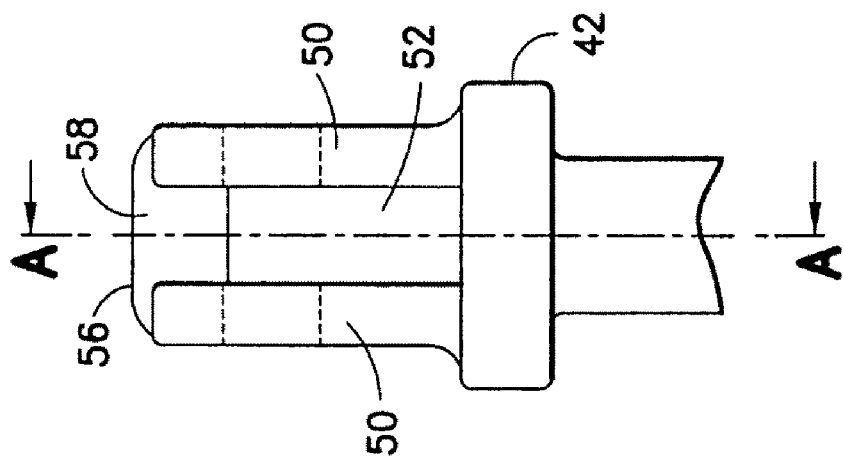
FIG. 4 is a bottom view of the clevis section shown in FIG. 3.
Figure 3:
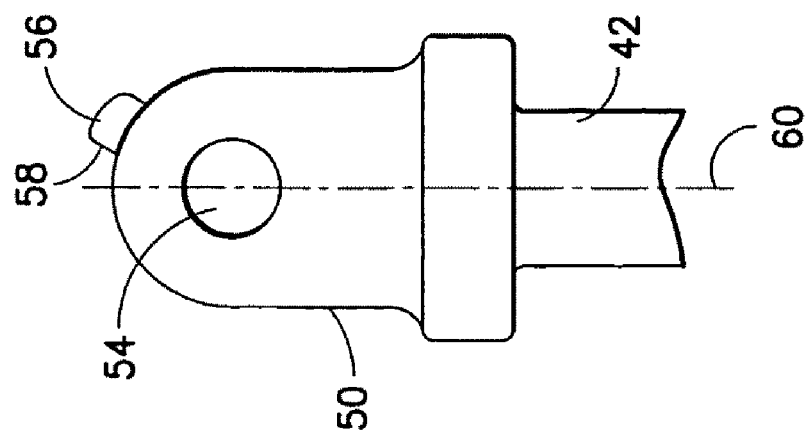
FIG. 3 is a side view of the clevis section of the dead end connector member shown in FIG. 2.

Referring also to FIG. 2, a dead end connector is shown incorporating features of the invention. Although the invention will be described with reference to the example embodiment shown in the drawings, it should be understood that the invention can be embodied in many alternate forms of embodiments. In addition, any suitable size, shape or type of elements or materials could be used.

In this example embodiment the connector 40 is identical to the first connector embodiment described in U.S. Pat. No. 7,348,489 B2 or U.S. patent application Ser. No. 12/321,679 (which are hereby incorporated by reference in their entireties) except the section of the dead end connector member used for connection to the insulator has a general clevis shape rather than an eyelet shape; as well as the differences noted below. However, features of the invention could be used in a connector having any suitably shaped insulator connection end so long as it includes a rotation limiter as generally describe below. Features of the invention could also be used in other types of dead end connectors.

Figure 6:
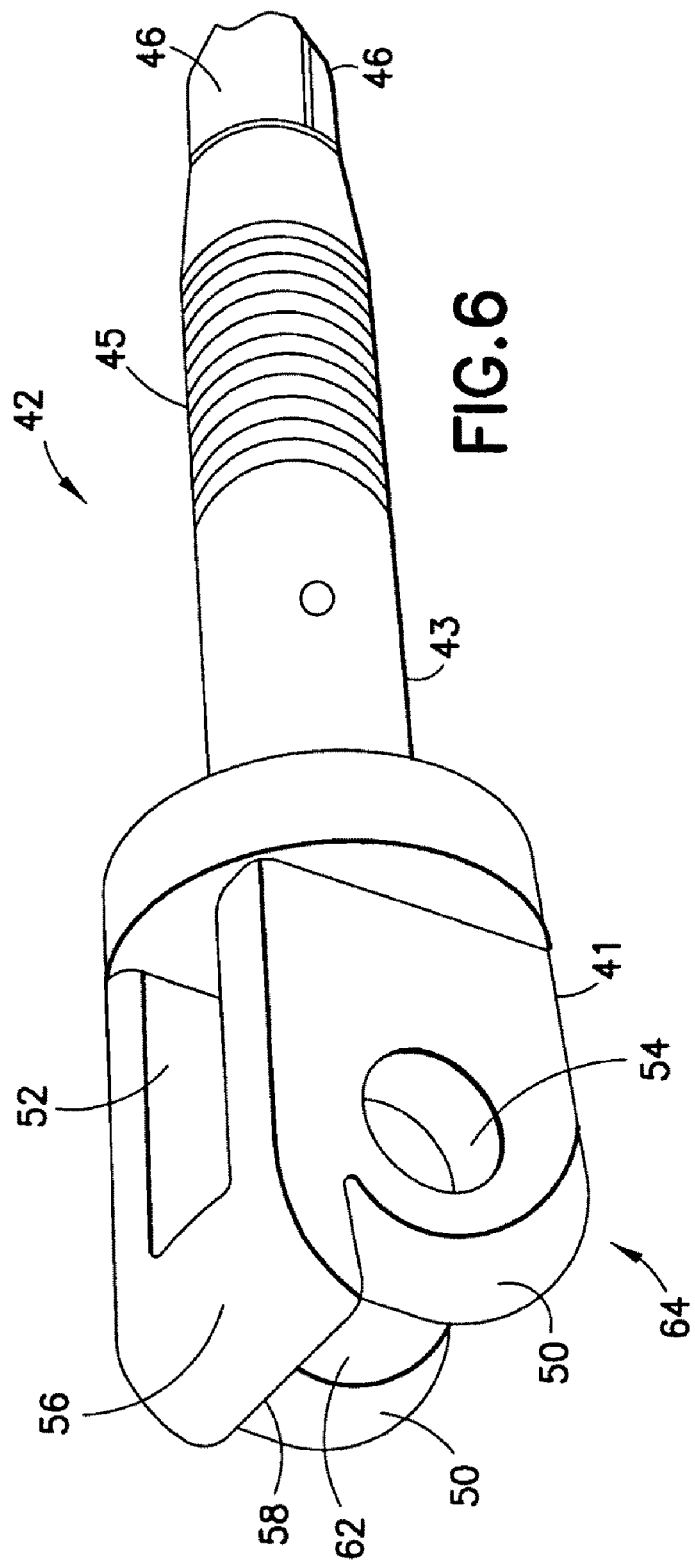
FIG. 6 is a perspective view of some of the components of the dead end connector shown in FIG. 2.

The connector 40 generally comprises a dead end connector member 42, an outer sleeve 44, wedges or jaws 46 and an inner sleeve 48. The wedges 46 are located on the core of the cable 12. The inner sleeve 48 keeps the wedges together. The outer sleeve 44 connects the inner sleeve 48 to the dead end connector member 42. Referring also to FIGS. 3-6, the rear end of the dead end connector member 42 has a general clevis shape with two legs 50 defining a slot or gap 52. FIG. 6 shows the dead end connector member 42 and jaws 46, but without showing the inner sleeve and the outer sleeve.

Each leg 50 has a pin hole 54. The pin or fastener 28 is located in the pin holes 54. When the connector 40 is connected to the insulator 20, the eyebolt 30 (which can be made of metal) of the insulator 20 is located in the slot 52. The pin 28 extends through a pin hole in the insulator eyebolt 30. Thus, the pin 28 connects the eyebolt 30 of the insulator 20 to the dead end connector member 42.

The dead end connector member 42 comprises a non-rotating tab 56. The tab 56 is integrally formed with the legs 50. The tab 56 has opposite ends connected to the two legs 50. The tab 56 bridges across the slot 52. As shown in the figures, the edge 58 of the tab 56 is offset from the longitudinal axis 60 of the dead end connector member 42. The edge 58 forms a stop surface or limiter surface. The edge 58 is located to contact a side or stem of the eyebolt 30 of the insulator 20 as shown in FIG. 2. However, the insulator eyebolt 30 and/or tab 56 might be configured to allow the longitudinal axes of the insulator and the connector 40 to be slightly angled when the edge 58 contacts the insulator eyebolt 30.

The tab 56 limits rotation of the dead end connector member 42 (and connector 40) on the pin 28 relative to the insulator 20 in direction 24. Thus, the dead end connector member 42 (and connector 40) cannot over-rotate in direction 24 relative to the insulator 20 on pin 28. This prevents contact and damage of the more brittle components 21 of the insulator 20. The components 20, 40 cannot over-rotate to the shape shown in FIG. 1. As the conductor 12 is pulled up in direction 22, the contact of the tab 56 with the eyebolt 30 can prevent the connector 40 from damaging the brittle members 21. However, the slot 52, being substantially open at its end 62 and one side 64, allows quick and easy insertion of the eyebolt 30 into the slot 52 with quick and easy alignment of the members 30, 50 for insertion of the pin 28. Thus, the invention can provide the quick and easy assembly which a clevis affords, but also provided a rotation limiter (at least in one direction) which prevents damage to the insulator when the conductor 12, connector 40 and insulator 20 are pulled up into tension.

An embodiment of the invention can provide a dead end connector having a clevis that prevents the dead end connector from rotating in one direction. The design prevents the dead end connector from rotating too far in one direction. As the dead end connector is being pulled up in directions 24 and 22, a non-rotating tab 56, located between the clevis legs 50 can prevent the insulator 20 and connector 40 from rotating relative to each other. The non-rotating tab 56 can make contact with the stem of the insulator eyebolt 30, thus preventing the insulator 20 and connector 40 from rotating relative to each other. Thus, the insulator 20 and connector 40 can be rotated up as a unit together; merely pivoting on the pin 14.

In one example embodiment a dead end connector member 42 can comprise a shaft section 43 comprising a ridge section 45, wherein the ridge section is sized and shaped to have an outer sleeve 44 compressed thereon to connect the outer sleeve to the shaft section; and a clevis section 41 having a front end connected to the shaft section 43, wherein the clevis section 41 comprises two spaced legs 50 forming an eyebolt receiving gap 52 between the legs, wherein each leg comprises a pin hole adapted to receive a fastener 28 to rotatably connected the dead end connector to an eyebolt 30 of another member 20, and wherein the clevis section 41 comprises a tab 56 at a rear end of the clevis section, wherein the tab extends at least partially across the gap 52 to form a rotation limiter adapted to contact one side of the eyebolt 30 and limit rotation of the dead end connector member relative to the eyebolt in only one direction.

The tab can extend across the gap and be directly connected to both of the legs. The tab can be located spaced from a center longitudinal axis 60 of the dead end connector member. The dead end connector member 42 can be used in a dead end connector 40 comprising an outer sleeve 44 adapted to receive the shaft section 43 therein and be connected onto the shaft section; an inner sleeve 48 adapted to be located inside the outer sleeve in front of a front end of the dead end connector member; and jaws 46 adapted to be located in the inner sleeve, wherein the jaws are adapted to be compressed by the inner sleeve and clamp onto a core of a core and stranded (C-S) cable 12. The connector can be combined into an assembly comprising an insulator 20 connecting the dead end connector to a support member 18; and a core and stranded (C-S) cable 12 connected to the dead end connector, wherein the dead end connector connects the C-S cable to the insulator to hang the C-S cable on the support member in tension.

In one example embodiment a dead end connector comprises a dead end connector member 42 comprising a shaft section 43 and a clevis section 41, wherein the clevis section 41 comprises two spaced legs 50 forming an eyebolt receiving gap 52 between the legs and a tab 56 at a rear end of the clevis section, wherein the tab extends at least partially across the gap to form a rotation limiter adapted to contact one side of an eyebolt and limit rotation of the dead end connector member relative to the eyebolt in one direction; an outer sleeve 44 connected over the shaft section; an inner sleeve 48 located inside the outer sleeve at a front end of the dead end connector member; and jaws 46 located in the inner sleeve, wherein the jaws are adapted to be compressed by the inner sleeve and clamp onto a core of a core and stranded (C-S) cable. The outer sleeve can be crimped on the shaft section of the dead end connector member. The outer sleeve can be crimped on the inner sleeve.

A method can comprise connecting a dead end connector 40 to a core and stranded (C-S) cable 12 comprising clamping a core of the C-S cable by jaws 46 and connecting the jaws to a dead end connector member 42, wherein the dead end connector member comprises a shaft section 43 connected to the jaws and a clevis section 41 connected to the shaft section, wherein the clevis section comprises two spaced legs 50 forming an eyebolt receiving gap 52 between the legs and a tab 56 at a rear end of the clevis section, wherein the tab extends at least partially across the gap to form a rotation limiter; and connecting the dead end connector member 42 to an insulator 20, wherein the insulator comprises ceramic insulating members 21 and an eyebolt 30 at an end of the ceramic insulating members, wherein the eyebolt is located in the gap 52 of the clevis section, and wherein the tab 56 is located relative to the eyebolt to limit rotation of the dead end connector member relative to the eyebolt in one direction. Connecting the dead end connector member to the insulator can comprise inserting a fastener in aligned holes of the legs and the eyebolt. Connecting the dead end connector to the C-S cable can comprise crimping an outer sleeve 44 of the dead end connector to the shaft section 43 of the dead end connector member, and crimping the outer sleeve 44 onto an inner sleeve 48 located around the jaws. The method can further comprise pulling on the C-S cable to pull the dead end connector and the insulator up in unison, wherein the rotation limiter prevents, at least partially, rotation of the dead end connector relative to the insulator.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A dead end connector comprising:
   a dead end connector member comprising:
      a shaft section comprising a ridge section, wherein the ridge section is sized and shaped to have an outer sleeve compressed thereon to connect the outer sleeve to the shaft section; and
      a clevis section having a front end connected to the shaft section, wherein the clevis section comprises two spaced legs forming an eyebolt receiving gap between the legs, wherein each leg comprises a pin hole adapted to receive a fastener to rotatably connected the dead end connector to an eyebolt of another member, and wherein the clevis section comprises a tab at a rear end of the clevis section, wherein the tab extends at least partially across the gap to form a rotation limiter adapted to contact one side of the eyebolt and limit rotation of the dead end connector member relative to the eyebolt in only one direction;
   an outer sleeve adapted to receive the shaft section therein and be connected onto the shaft section;
   an inner sleeve adapted to be located inside the outer sleeve in front of a front end of the dead end connector member; and
   jaws adapted to be located in the inner sleeve, wherein the jaws are adapted to be compressed by the inner sleeve and clamp onto a core of a core and stranded (C-S) cable.

2. A dead end connector member as in claim 1 wherein the tab extends across the gap and is directly connected to both of the legs.

3. A dead end connector member as in claim 1 wherein the tab is located spaced from a center longitudinal axis of the dead end connector member.

4. An assembly comprising:
   the dead end connector as in claim 1;
   an insulator connecting the dead end connector to a support member; and
   a core and stranded (C-S) cable connected to the dead end connector, wherein the dead end connector connects the C-S cable to the insulator to hang the C-S cable on the support member in tension.

5. A dead end connector comprising:
   a dead end connector member comprising a shaft section and a clevis section, wherein the clevis section comprises two spaced legs forming an eyebolt receiving gap between the legs and a tab at a rear end of the clevis section, where the clevis section is configured to be rotatably connected to an eyebolt in the eyebolt receiving area, wherein the tab extends at least partially across the gap to form a rotation limiter adapted to contact one side of the eyebolt and limit rotation of the dead end connector member relative to the eyebolt in only one direction;
   an outer sleeve connected over the shaft section;
   an inner sleeve located inside the outer sleeve at a front end of the dead end connector member; and
   jaws located in the inner sleeve, wherein the jaws are adapted to be compressed by the inner sleeve and clamp onto a core of a core and stranded (C-S) cable.

6. A dead end connector as in claim 5 wherein the tab extends across the gap and is directly connected to both of the legs.

7. A dead end connector as in claim 5 wherein the tab is located spaced from a center longitudinal axis of the dead end connector member.

8. A dead end connector as in claim 7 wherein the dead end connector member comprises only the one tab between the two legs.

9. A dead end connector as in claim 5 wherein the outer sleeve is crimped on the shaft section of the dead end connector member.

10. A dead end connector as in claim 9 wherein the outer sleeve is crimped on the inner sleeve.

11. A dead end connector as in claim 5 further comprising a fastener adapted to extend through holes of the clevis section and the eyebolt to rotatably attach the eyebolt to the clevis section.

12. An assembly comprising:
   the dead end connector as in claim 5;
   an insulator connecting the dead end connector to a support member; and a core and stranded (C-S) cable connected to the dead end connector, wherein the dead end connector connects the C-S cable to the insulator to hang the C-S cable on the support member in tension.

13. A method comprising:

connecting a dead end connector to a core and stranded (C-S) cable comprising clamping a core of the C-S cable by jaws and connecting the jaws to a dead end connector member, wherein the dead end connector member comprises a shaft section connected to the jaws and a clevis section connected to the shaft section, wherein the clevis section comprises two spaced legs forming an eyebolt receiving gap between the legs and a tab at a rear end of the clevis section, wherein the tab extends at least partially across the gap to form a rotation limiter; and rotatably connecting the dead end connector member to an insulator such that the dead end connector member is rotatably relative to the insulator, wherein the insulator comprises ceramic insulating members and an eyebolt at an end of the ceramic insulating members, wherein the eyebolt is located in the gap of the clevis section, and wherein the tab is located relative to the eyebolt to limit rotation of the dead end connector member relative to the eyebolt in one direction.

14. A method as in claim 13 wherein connecting the dead end connector member to the insulator comprises inserting a fastener in aligned holes of the legs and the eyebolt.

15. A method as in claim 13 wherein connecting the dead end connector to the C-S cable comprises crimping an outer sleeve of the dead end connector to the shaft section of the dead end connector member, and crimping the outer sleeve onto an inner sleeve located around the jaws.

16. A method as in claim 13 further comprising pulling on the C-S cable to pull the dead end connector and the insulator up in unison, wherein the rotation limiter prevents, at least partially, rotation of the dead end connector relative to the insulator.

* * * * *